US012360786B2

(12) United States Patent
Hu et al.

(10) Patent No.: US 12,360,786 B2
(45) Date of Patent: Jul. 15, 2025

(54) SCREEN WINDOW REDRAWING METHOD, ELECTRONIC DEVICE, AND COMPUTER-READABLE STORAGE MEDIUM

(71) Applicant: Huawei Technologies Co., Ltd., Shenzhen (CN)

(72) Inventors: Wancheng Hu, Wuhan (CN); Yinong Li, Wuhan (CN); Jinglei Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/042,232

(22) PCT Filed: Aug. 2, 2021

(86) PCT No.: PCT/CN2021/110035
§ 371 (c)(1),
(2) Date: Feb. 20, 2023

(87) PCT Pub. No.: WO2022/037400
PCT Pub. Date: Feb. 24, 2022

(65) Prior Publication Data
US 2023/0325208 A1 Oct. 12, 2023

(30) Foreign Application Priority Data
Aug. 18, 2020 (CN) .......................... 202010833689.1

(51) Int. Cl.
G06F 9/445 (2018.01)
G06F 1/16 (2006.01)
G06F 9/451 (2018.01)

(52) U.S. Cl.
CPC ............ G06F 9/451 (2018.02); G06F 1/1677 (2013.01)

(58) Field of Classification Search
CPC ...... G06F 9/451; G06F 1/1647; G06F 1/1677; G06F 9/445; H04M 1/0214; H04M 1/724631
See application file for complete search history.

(56) References Cited

U.S. PATENT DOCUMENTS 8,200,418 B2 * 6/2012 Ogawa ............... G01C 21/3605
701/428
9,973,620 B2 * 5/2018 Baek ............... H04M 1/724092
(Continued)

FOREIGN PATENT DOCUMENTS

| CN | 109981839 A | 7/2019 |
| CN | 110515519 A | 11/2019 |
| EP | 3896946 A1 | 10/2021 |

*Primary Examiner* — Alvin H Tan
(74) *Attorney, Agent, or Firm* — Conley Rose, P.C.

(57) ABSTRACT

A screen window redrawing method includes detecting whether a current device is in a screen-off state. If it is detected that the current device is in the screen-off state, whether a screen form of the current device changes is detected by using obtained screen form information before screen-off and obtained screen form information after screen-off. If it is detected that the screen form changes, a to-be-displayed screen is determined based on the screen form information after screen-off. A window of the to-be-displayed screen is redrawn based on an obtained size of a display area of the to-be-displayed screen.

20 Claims, 8 Drawing Sheets

(56) References Cited

U.S. PATENT DOCUMENTS

| | | | |
|---|---|---|---|
| 10,403,241 B2 * | 9/2019 | Kim | G09G 3/20 |
| 10,866,694 B2 * | 12/2020 | Kim | G06F 3/1446 |
| 11,409,488 B2 * | 8/2022 | Kwon | G06F 1/1643 |
| 11,915,012 B2 * | 2/2024 | Regev | G06Q 20/3563 |
| 12,039,345 B2 * | 7/2024 | Wix | G06F 9/445 |
| 2016/0282962 A1 | 9/2016 | Shaffer et al. | |
| 2019/0370021 A1 | 12/2019 | Chen et al. | |

* cited by examiner

SCREEN WINDOW REDRAWING METHOD, ELECTRONIC DEVICE, AND COMPUTER-READABLE STORAGE MEDIUM

CROSS-REFERENCE TO RELATED APPLICATIONS

This is a National Stage of International Patent Application No. PCT/CN2021/110035 filed on Aug. 2, 2021, which claims priority to Chinese Patent Application No. 202010833689.1 filed on Aug. 18, 2020, both of which are hereby incorporated by reference in their entireties.

TECHNICAL FIELD

This application relates to the field of mobile terminal technologies, and in particular, to a screen window redrawing method, an electronic device, and a computer-readable storage medium.

BACKGROUND

A multi-screen device or a device with a foldable screen is increasingly popular with common users. In a process of using the device by the user, there is a scenario such as a fingerprint unlock screen-on scenario or a face unlock screen-on scenario, so that an application window used by the user is directly displayed after screen-on. However, in a related technology, for a single-screen scenario, a screen window redrawing procedure is generally that when a screen-on scenario is triggered, a screen can be turned on only after an application window on which previous screen-off is performed is drawn, thereby causing a problem of prolonging screen-on duration. In addition, for a multi-screen scenario, a screen window redrawing procedure is generally that when a scenario of a screen A is screen-off, and after the user changes a screen form of the current device, a screen-on scenario of a screen B needs to be triggered when screen-on is triggered next time. Because the screen A is different from the screen B, triggering the screen-on scenario of the screen B in this case easily causes a problem that the screen-on duration is multiplied due to a difference in a hardware screen size when window redrawing is performed on a display area of the screen B.

SUMMARY

In view of this, this application provides a screen window redrawing method, an electronic device, and a computer-readable storage medium, so that a screen form change can be identified in a screen-off state, and window redrawing can be completed in advance, to shorten screen-on duration and improve screen window redrawing efficiency.

According to a first aspect, an embodiment of this application provides a screen window redrawing method, including:
  detecting whether a current device is in a screen-off state;
  if it is detected that the current device is in the screen-off state, detecting, by using obtained screen form information before screen-off and obtained screen form information after screen-off, whether a screen form of the current device changes;
  determining a to-be-displayed screen based on the screen form information after screen-off if it is detected that the screen form changes; and
  redrawing a window of the to-be-displayed screen based on an obtained size of a display area of the to-be-displayed screen.

In a possible implementation, the detecting, by using obtained screen form information before screen-off and obtained screen form information after screen-oft whether a screen form of the current device changes includes:
  detecting whether the screen form information before screen-off is the same as the screen form information after screen-off; and
  if it is detected that the screen form information before screen-off is different from the screen form information after screen-off, determining that the screen form of the current device changes.

In a possible implementation, the screen form information after screen-off includes a screen included angle and a vertical gravity component; and
  the determining a to-be-displayed screen based on the screen form information after screen-off if it is detected that the screen form changes includes:
  determining a device status of the current device based on the screen included angle, where the device status includes a folded state, a semi-unfolded state, or a fully unfolded state; and
  determining a screen orientation of the current device based on the device status and the vertical gravity component, and determining a display screen facing a user as the to-be-displayed screen of the current device.

In a possible implementation, before the redrawing a window of the to-be-displayed screen based on an obtained size of a display area of the to-be-displayed screen, the method includes:
  obtaining a screen identifier corresponding to the to-be-displayed screen; determining whether the screen identifier is the same as a screen identifier of a display screen before screen-off; and
  if it is determined that the screen identifier is the same as the screen identifier of the display screen before screen-off determining a screen size of the display screen before screen-off as a screen size of the to-be-displayed screen; and
  determining the size of the display area of the to-be-displayed screen based on an obtained setting mode of the to-be-displayed screen and the screen size of the to-be-displayed screen, and continuing to perform the step of redrawing a window of the to-be-displayed screen based on an obtained size of a display area of the to-be-displayed screen, where the setting mode is used to indicate a running scenario of the current device; or
  if it is determined that the screen identifier is different from the screen identifier of the display screen before screen-off, determining a screen size of the to-be-displayed screen based on the screen identifier; and
  determining the size of the display area of the to-be-displayed screen based on an obtained setting mode of the to-be-displayed screen and the screen size of the to-be-displayed screen, and continuing to perform the step of redrawing a window of the to-be-displayed screen based on an obtained size of a display area of the to-be-displayed screen.

According to a second aspect, an embodiment of this application provides an electronic device. The device includes:
  a display screen, one or more processors, a memory, and one or more computer programs, where the one or more computer programs are stored in the memory, the one or more computer programs include instructions, and when the instructions are executed by the device, the device is enabled to perform the following steps:
detecting whether the current device is in a screen-off state;
if it is detected that the current device is in the screen-off state, detecting, by using obtained screen form information before screen-off and obtained screen form information after screen-off, whether a screen form of the current device changes;
determining a to-be-displayed screen based on the screen form information after screen-off if it is detected that the screen form changes; and
redrawing a window of the to-be-displayed screen based on an obtained size of a display area of the to-be-displayed screen.

In a possible implementation, when the instructions are executed by the device, the device is enabled to specifically perform the following steps:
detecting whether the screen form information before screen-off is the same as the screen form information after screen-off; and
if it is detected that the screen form information before screen-off is different from the screen form information after screen-off, determining that the screen form of the current device changes.

In a possible implementation, the screen form information after screen-off includes a screen included angle and a vertical gravity component; and
when the instructions are executed by the device, the device is enabled to specifically perform the following steps:
determining a device status of the current device based on the screen included angle, where the device status includes a folded state, a semi-unfolded state, or a fully unfolded state; and
determining a screen orientation of the current device based on the device status and the vertical gravity component, and determining a display screen facing a user as the to-be-displayed screen of the current device.

In a possible implementation, when the instructions are executed by the device, the device is enabled to specifically perform the following steps:
obtaining a screen identifier corresponding to the to-be-displayed screen;
determining whether the screen identifier is the same as a screen identifier of a display screen before screen-off; and
if it is determined that the screen identifier is the same as the screen identifier of the display screen before screen-off, determining a screen size of the display screen before screen-off as a screen size of the to-be-displayed screen; and
determining the size of the display area of the to-be-displayed screen based on an obtained setting mode of the to-be-displayed screen and the screen size of the to-be-displayed screen, and continuing to perform the step of redrawing a window of the to-be-displayed screen based on an obtained size of a display area of the to-be-displayed screen, where the setting mode is used to indicate a running scenario of the current device; or
if it is determined that the screen identifier is different from the screen identifier of the display screen before screen-off, determining a screen size of the to-be-displayed screen based on the screen identifier; and
determining the size of the display area of the to-be-displayed screen based on an obtained setting mode of the to-be-displayed screen and the screen size of the to-be-displayed screen, and continuing to perform the step of redrawing a window of the to-be-displayed screen based on an obtained size of a display area of the to-be-displayed screen.

According to a third aspect, an embodiment of this application provides a computer-readable storage medium. The computer-readable storage medium is used to store program code to be executed by a device, and the program code includes instructions used to perform the method according to any one of the first aspect or the possible implementations of the first aspect.

In the technical solutions provided in embodiments of this application, whether the current device is in the screen-off state is detected. If it is detected that the current device is in the screen-off state, whether the screen form of the current device changes is detected by using the obtained screen form information before screen-off and the obtained screen form information after screen-off. If it is detected that the screen form changes, the to-be-displayed screen is determined based on the screen form information after screen-off. The window of the to-be-displayed screen is redrawn based on the obtained size of the display area of the to-be-displayed screen. In this way, a screen form change is identified in the screen-off state, and window redrawing is completed in advance, to shorten screen-on duration and improve screen window redrawing efficiency.

DESCRIPTION OF EMBODIMENTS

Figure 1A:
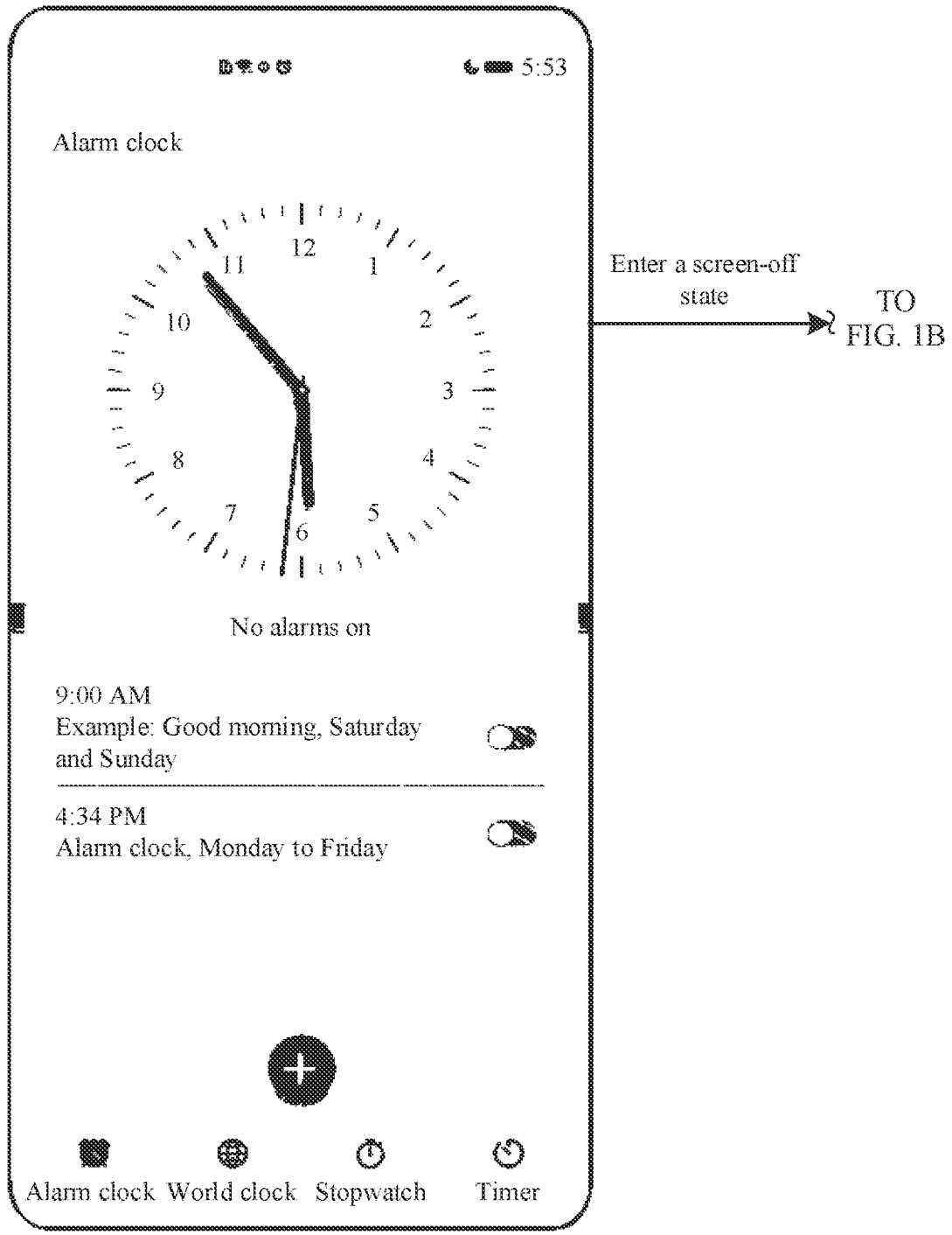
FIG. 1A to FIG. 1D are a flowchart of screen window redrawing according to a related technology.
Figure 1B:
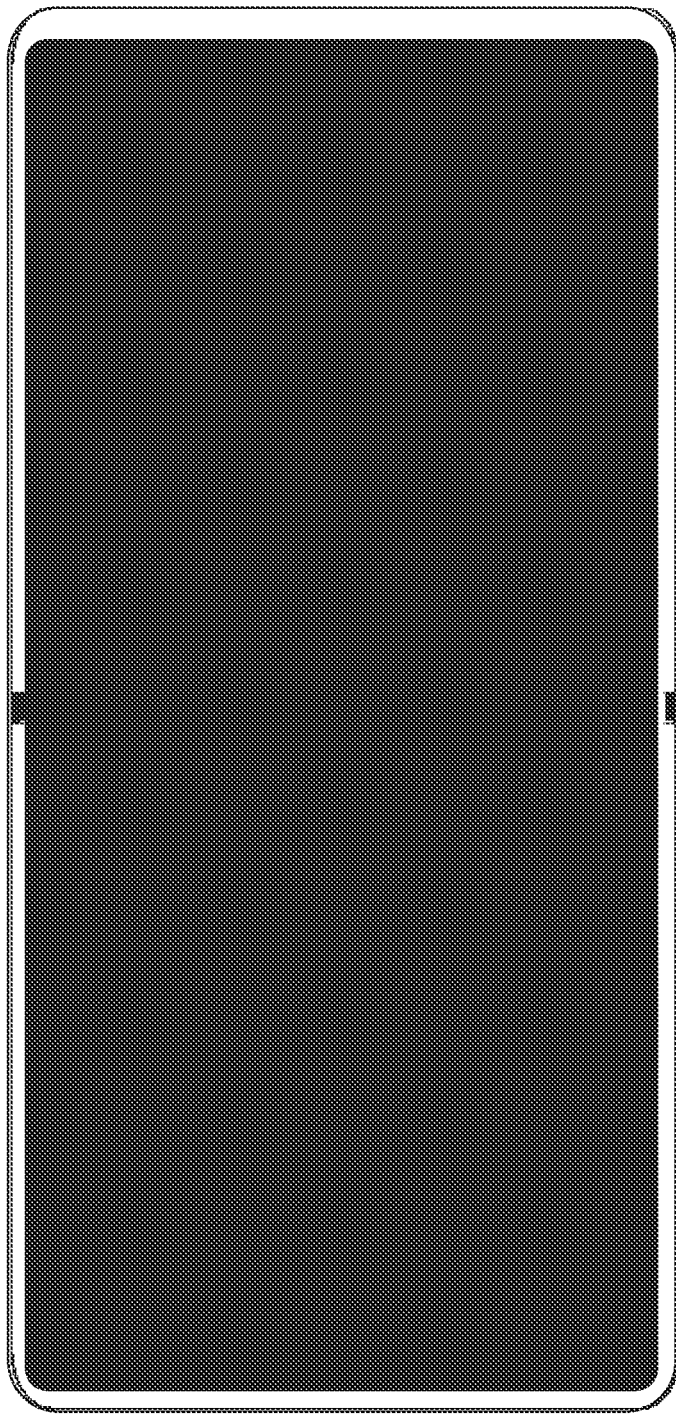
Figure 1C:
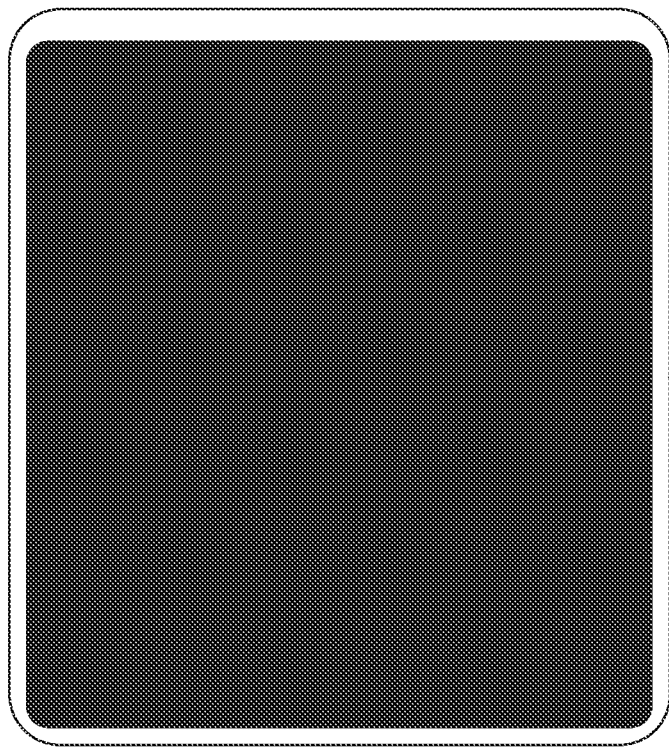
Figure 1D:
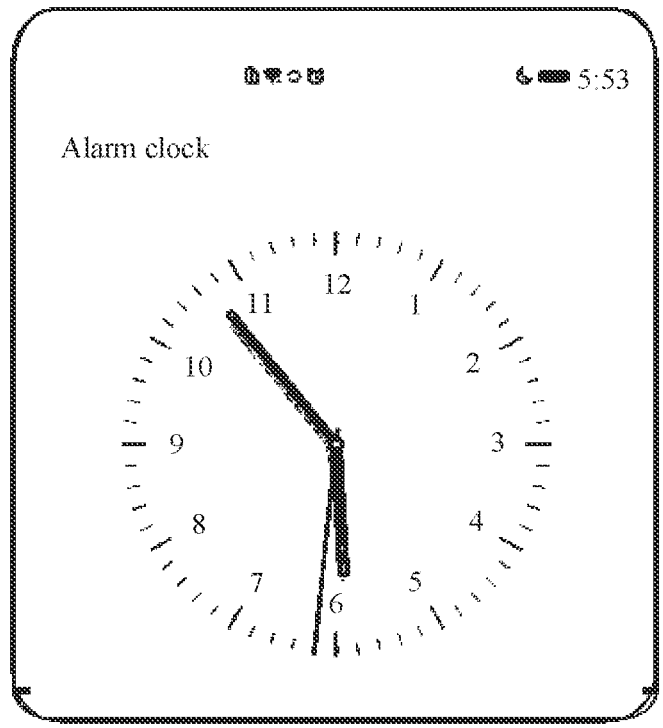

To better understand technical solutions of this application, the following describes embodiments of this application in detail with reference to accompanying drawings.

It should be clarified that the described embodiments are merely some rather than all embodiments of this application. All other embodiments obtained by a person of ordinary skill in the art based on embodiments of this application without creative efforts shall fall within the protection scope of this application.

The terms used in embodiments of this application are merely for the purpose of illustrating specific embodiments, and are not intended to limit this application. The terms "a", "said" and "the" of singular forms used in embodiments and the appended claims of this application are also intended to include plural forms, unless otherwise specified in the context clearly.

It should be understood that the term "and/or" used in this specification merely describes an association relationship between associated objects, and indicates that there may be three relationships. For example, A and/or B may indicate three cases: There is only A, there are both A and B, and there is only B. In addition, the character "/" in this specification generally indicates an "or" relationship between the associated objects.

FIG. 1A to FIG. 1D are a flowchart of screen window redrawing according to a related technology. As shown in FIG. 1A to FIG. 1D, after a terminal device switches from a screen-on state to a screen-off state, a user may change a screen form of the terminal device based on a requirement, for example, flip or fold a display screen of the terminal device. When the user triggers a screen-on instruction next time, the terminal device receives the screen-on instruction of the user, determines a size of a to-be-displayed screen based on the screen form, performs window redrawing for the size of the to-be-displayed screen until an application window on which previous screen-off is performed is drawn, and then turns on the screen. The screen-on instruction may include a fingerprint unlock instruction and a key unlock instruction.

However, in the related technology, when the user triggers screen-on, the screen can be turned on only after the application window on which previous screen-off is performed is drawn, thereby causing a problem of prolonging screen-on duration. That is, a process from triggering the screen-on instruction by the user to turning on the screen takes a long time. In addition, in a screen window redrawing procedure in the related technology, the problem of prolonging screen-on duration is also likely to be caused in a multi-screen scenario. Specifically, that a terminal device has a double-sided screen is used as an example. The terminal device includes two display screens: a screen A and a screen B. When a scenario of the screen A is screen-off, and when a user flips the terminal device and triggers a screen-on instruction, a to-be-displayed screen is changed after the user flips the current device, for example, the to-be-displayed screen is the screen B in this case. Because the screen B is inconsistent with a previous display screen (the screen A), if the user triggers screen-on in this case, window redrawing causes a problem of multiplying screen-on duration, due to a difference in a hardware screen size. Generally, in a scenario in which a screen needs to be turned on after a screen form of the terminal device is changed in a screen-off state, screen window redrawing in the related technology is not performed in advance, thereby causing the problem of prolonging screen-on duration. In addition, due to a display screen layout difference, window redrawing is complex, and the screen-on duration is multiplied, thereby seriously affecting user experience.

For the foregoing problem, this application provides a screen window redrawing method, to resolve the problem, in the related technology, that the screen-on duration is increased because window redrawing is not performed in advance, and further resolve the problem that the screen-on duration is further multiplied due to window redrawing performed when the hardware screen size is different, to shorten the screen-on duration and improve screen window redrawing efficiency.

Figure 2:
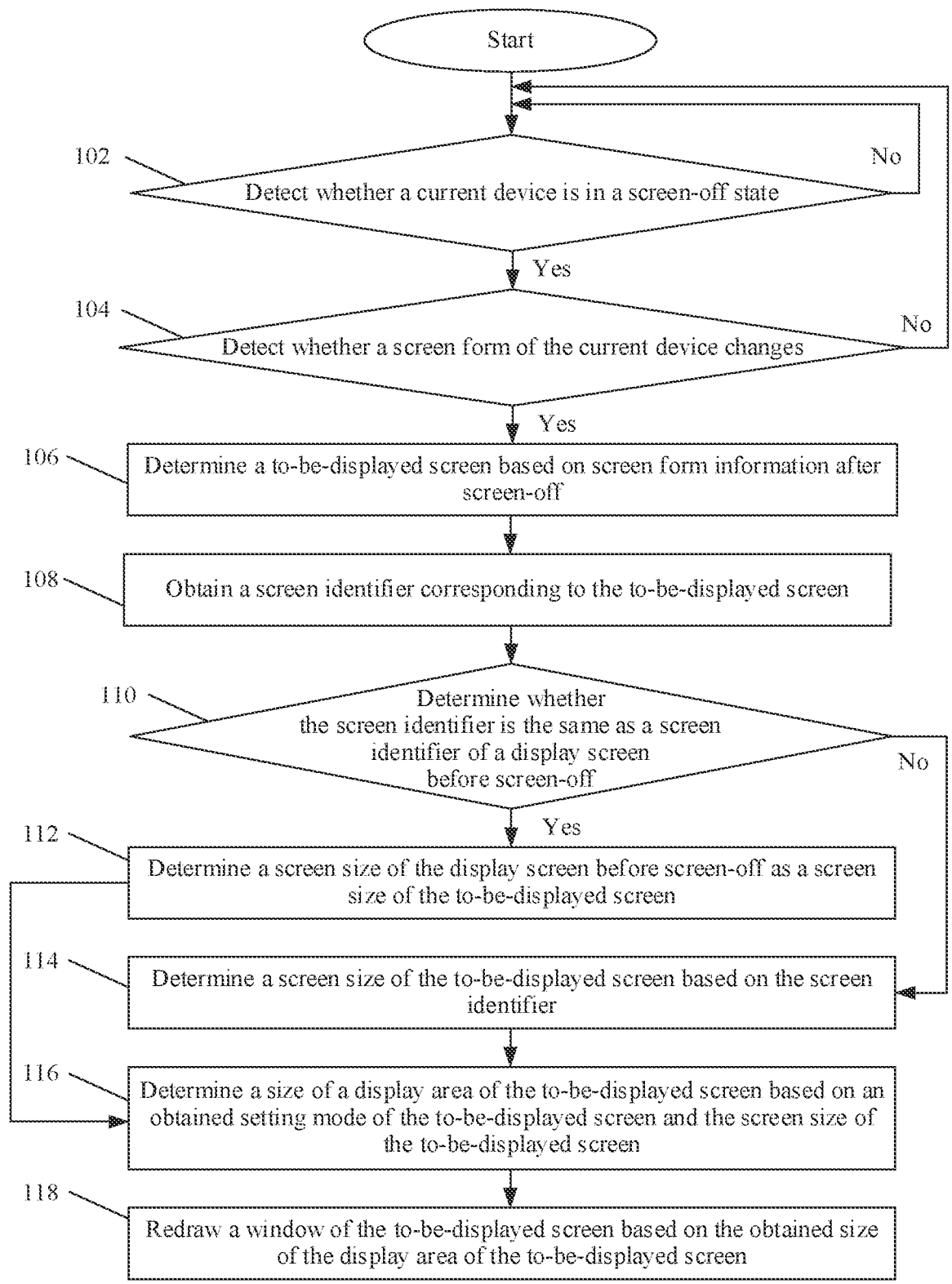
FIG. 2 is a flowchart of a screen window redrawing method according to an embodiment of this application.

FIG. 2 is a flowchart of a screen window redrawing method according to an embodiment of this application. As shown in FIG. 2, the method includes the following steps.

Step 102: Detect whether a current device is in a screen-off state; and if yes, perform Step 104; or if no, the procedure ends.

In this embodiment of this application, the current device may be a terminal device, such as a mobile phone terminal, a tablet computer, a notebook computer, an augmented reality (augmented reality, AR for short) AR/virtual reality (virtual reality, VR for short) terminal, or a vehicle-mounted terminal; or may be a server, a cloud, or the like. It should be noted that terminals in this application are all electronic devices having a function of changing a screen form, for example, a mobile phone with a foldable screen or a mobile phone with a flip screen.

In this embodiment of this application, the current device may include a power-off state, the screen-off state, or a screen-on state. The screen-off state is used to indicate that the current device is in a background working state. When it is detected that the current device is in the screen-off state, it indicates that a condition for changing a screen form is met, and subsequent Step 104 may continue to be performed to detect whether a screen form of the current device is changed. When it is detected that the current device is not in the screen-off state, it indicates that the condition for changing a screen form is not met. In this case, the procedure ends. The procedure is not triggered until it is detected that the current device is in the screen-off state again.

Step 104: Detect, by using obtained screen form information before screen-off and obtained screen form information after screen-off, whether the screen form of the current device changes; and if yes, perform Step 106; or if no, continue to perform Step 102.

In this embodiment of this application, the screen form information includes a screen included angle and a vertical gravity component. The screen included angle is used to indicate an included angle between display screens. The vertical gravity component is used to indicate a projection size of a gravity G component on a Z axis in a spatial coordinate system. The screen form is used to indicate a screen posture of the current device and a screen size ratio change. The screen posture may include a posture such as folding inward, folding outward, or flipping.

A manner of determining the vertical gravity component may include: In an initial state, a direction of gravity G points to the core of the earth, that is, vertically downward; and a projection size of a gravity G component on a Z axis is calculated by establishing a spatial coordinate system on a screen. The vertical gravity component may include positive G and negative G.

Further, in this embodiment of this application, a screen orientation of the current device may be further determined by obtaining the vertical gravity component. Specifically, in the initial state, the direction of gravity G points to the core of the earth, that is, vertically downward. The screen orientation of the current device is determined by establishing the spatial coordinate system on the screen and calculating the projection size of the gravity G component on the Z axis. A process of establishing the spatial coordinate system on the screen may include establishing an X axis, a Y axis, and a Z axis at a position of an upper left corner relative to the screen, where the Z axis is vertically upward. When the projection size of the gravity G component on the Z axis is negative G, it can be determined that the screen of the current device faces a user. When the projection size of the gravity G component on the Z axis is G, it can be determined that the screen orientation of the current device is downward.

It should be noted that, after the screen orientation of the current device is determined by obtaining the vertical gravity component, it is further necessary to determine whether the screen orientation of the current device is a user-facing direction, so that a display screen facing the user is determined as a to-be-displayed screen in a subsequent step. In a manner of determining whether the screen orientation of the current device is the user-facing direction, a face may be captured by using a front camera, and whether the screen orientation of the current device is the user-facing direction may be determined with reference to an angle of a human eye. A facial recognition technology and a manner of determining the angle of the human eye are not described in detail in this application. An existing related technology may be used to implement the foregoing determining process.

In this embodiment of this application, before Step 104 is performed, the method further includes: registering a detection component. For example, events corresponding to a HAL and a sensor are registered by using a SensorManager tool, to set a detection component that can detect a change of the screen included angle. When it is detected that the screen form of the current device changes, for example, when the current device makes a change of the screen posture such as folding inward, folding outward, or flipping, and when the user selects a specified screen to be turned on, a size of the to-be-displayed screen of the current terminal changes compared with a display screen on which previous screen-off is performed. Therefore, the detection component can detect, based on the obtained form information, that the screen form of the current device changes.

In this embodiment of this application, in an optional solution, whether the screen form of the current device changes may be detected based on the obtained form information by using a sensor algorithm. Specifically, a detection component may be registered by using a function SensorManager.registerListener( ). The detection component is configured to detect the screen included angle and the vertical gravity component. Specifically, screen included angle information may be calculated by using a SensorHub detection component. Further, the screen form of the current device is listened to in real time by using a function OnSensorChanged( ), a screen included angle and a vertical gravity component that are reported by the detection component are received when the screen included angle changes, and whether the screen form of the current device changes is determined based on the reported screen included angle and vertical gravity component. For a specific determining process, refer to two solutions in the following embodiment.

In this embodiment of this application. Step 104 may specifically include:

Step 1041: Detect whether the screen form information before screen-off is the same as the screen form information after screen-off; and if no, perform Step 1042; or if yes, the procedure ends.

In this embodiment of this application, if it is detected that the screen form information before screen-off is the same as the screen form information after screen-off, it indicates that the screen form of the current device does not change, and an execution condition of this embodiment of this application is not met. Therefore, the procedure ends, or Step 1041 continues to be performed, to detect whether the screen form information before screen-off is the same as the screen form information after screen-off. If it is detected that the screen form information before screen-off is different from the screen form information after screen-off, it indicates that the screen form of the current device changes, and a window redrawing condition is met, so that a subsequent step may continue to be performed.

Step 1042: Determine that the screen form of the current device changes, and continue to perform Step 106. In this embodiment of this application, in an optional solution, for example, the screen form information before screen-off includes a screen included angle of 0°, and the vertical gravity component is negative G, that is, the screen orientation of the current device is upward. The screen form information after screen-off includes a screen included angle of 180°, and the vertical gravity component is negative G, that is, the screen orientation of the current device is upward. By performing Step 104, it can be determined that the screen form of the current device changes, that is, the screen included angle changes. In actual application, it is equivalent to that the screen form of the current device before screen-off is in a folded state (inward folded or outward folded), and the screen posture of the current device after screen-off is in a fully unfolded state. After the current device is unfolded, the screen posture and a screen size ratio change. That the current device includes two display screens: a screen A and a screen B is used as an example. When the current device changes from the folded state to the fully unfolded state, an included angle between the screen A and the screen B may vary from 0° to 180°. In this case, because the screen included angle changes, it may be determined that the screen form of the current device changes. A screen form change may be specifically reflected as a screen posture change and a screen size ratio change.

In another optional solution, for example, the screen form information before screen-off includes a screen included angle of 0°, and the vertical gravity component is G, that is, the screen orientation of the current device is downward. The screen form information after screen-off includes a screen included angle of 180°, and the vertical gravity component is negative G, that is, the screen orientation of the current device is upward. By performing Step 104, it can be determined that the screen form of the current device changes, that is, the screen included angle changes, and the vertical gravity component also changes.

It should be noted that, when either of the screen included angle and the vertical gravity component changes, it may indicate that the screen form of the current device changes. In this embodiment of this application, that the screen form information includes the screen included angle and the vertical gravity component is merely an example for description. In addition, the screen form information may further include another parameter. This is not limited in this application.

Step 106: Determine the to-be-displayed screen based on the screen form information after screen-off.

In this embodiment of this application, the screen form after screen-off includes a screen included angle and a vertical gravity component.

In this embodiment of this application, Step 106 may specifically include:

Step 1061: Determine a device status of the current device based on the screen included angle, where the device status includes a folded state, a semi-unfolded state, or a fully unfolded state.

In this embodiment of this application, $0° \leq$ screen included angle range $\leq 180°$ The screen included angle is determined based on a minimum granularity detected by the detection component. When detection precision is 2 degrees, it may be considered that the device status of the current device is the folded state when the screen included angle is less than 3 degrees. That is, when $0° \leq$ screen included angle $<3°$, it is determined that the device status of the current device includes the folded state. When $3° \leq$ screen included angle $<177°$, it is determined that the device status of the current device includes the semi-unfolded state. When $177° \leq$ screen included angle $\leq 180°$, it is determined that the device status of the current device includes the fully unfolded state.

In this embodiment of this application, the folded state may include an outward folded state and an inward folded state.

Step 1062: Determine the screen orientation of the current device based on the device status and the vertical gravity component, and determine a display screen facing the user as the to-be-displayed screen of the current device. In this embodiment of this application, the screen orientation of the current device may be determined by obtaining the vertical gravity component by using the foregoing embodiment. In an optional solution, that the current device includes a screen A and a screen B is used as an example. When the current device is in the fully unfolded state, for example, when a screen included angle between the screen A and the screen B is 180°, it is determined, by using the vertical gravity component, that an orientation of the screen A of the current device is upward, and an orientation of the screen B is downward. In addition, in this case, a display screen facing the user is the screen A. Therefore, the screen A is determined as the to-be-displayed screen of the current device.

In another optional solution, that the current device includes a screen A and a screen B is used as an example. The screen A is an inner screen, and the screen B is an outer screen. When the current device is in the outward folded state, that is, when a screen included angle between the screen A and the screen B is 0°, because the device status in this case is the outward folded state, it is determined, by using the vertical gravity component, that a display screen facing the user is the inner screen, that is, the screen A. Therefore, the screen A is determined as the to-be-displayed screen of the current device.

In another optional solution, that the current device includes a screen A and a screen B is used as an example. The screen A is an inner screen, and the screen B is an outer screen. When the current device is in the inward folded state, that is, when a screen included angle between the screen A and the screen B is 0°, because the device status in this case is the inward folded state, it is determined, by using the vertical gravity component, that a display screen facing the user is the outer screen, that is, the screen B. Therefore, the screen B is determined as the to-be-displayed screen of the current device.

Step 108: Obtain a screen identifier corresponding to the to-be-displayed screen.

In this embodiment of this application, the screen identifier is unique, that is, each to-be-displayed screen corresponds to a different screen identifier. For example, when the current device is in the folded state, a plurality of display screens may be included, and an ID value of a physical screen corresponding to each display screen is different. For example, a screen identifier corresponding to a screen A is 1, and a screen identifier corresponding to a screen B is 2.

Step 110: Determine whether the screen identifier is the same as a screen identifier of a display screen before screen-off; and if yes, perform Step 112; or if no, perform Step 114.

In this embodiment of this application, if it is determined that the screen identifier is the same as the screen identifier of the display screen before screen-off, it indicates that the to-be-displayed screen is the same as the display screen before screen-off. If it is determined that the screen identifier is different from the screen identifier of the display screen before screen-off, it indicates that the to-be-displayed screen is different from the display screen before screen-off. For example, the display screen before screen-off includes a screen A and a screen B, where a screen identifier corresponding to the screen A is 1, and a screen identifier corresponding to the screen B is 2. When the obtained screen identifier of the to-be-displayed screen is 2, it indicates that the screen identifier of the to-be-displayed screen is different from the screen identifier of the display screen before screen-off.

Step 112: Determine a screen size of the display screen before screen-off as a screen size of the to-be-displayed screen, and continue to perform Step 116.

In this embodiment of this application, if it is determined that the screen identifier is the same as the screen identifier of the display screen before screen-off, it indicates that the to-be-displayed screen is the same as the display screen before screen-off. Therefore, the screen size of the display screen before screen-off is determined as the screen size of the to-be-displayed screen. The screen size of the to-be-displayed screen is determined, so that a size of a display area of the to-be-displayed screen is determined in a subsequent step.

It should be noted that the screen size is used to indicate a size of the display screen. The size of the display area is used to indicate a size limited based on a user setting or a device condition. That is, the screen size of the to-be-displayed screen≥the size of the display area of the to-be-displayed screen. A display screen of a mobile phone is used as an example. Generally, a screen size of the mobile phone is greater than a size of a display area.

Step 114: Determine a screen size of the to-be-displayed screen based on the screen identifier, and continue to perform Step 116.

In this embodiment of this application, each display screen corresponds to a different screen identifier. Therefore, a screen size of each to-be-displayed screen may be queried by using a screen identifier.

Step 116: Determine the size of the display area of the to-be-displayed screen based on an obtained setting mode of the to-be-displayed screen and the screen size of the to-be-displayed screen, and continue to perform Step 118.

In this embodiment of this application, the screen size of the to-be-displayed screen may be understood as a physical screen size, the size of the display area of the to-be-displayed screen may be understood as a specific size of a display area, and the size of the display area falls within a physical screen size range.

In this embodiment of this application, the setting mode is used to indicate a running scenario of the current device. The setting mode of the to-be-displayed screen may include a one-hand mode, a self-portrait collaboration mode, an interactive mode, a game mode, or the like. In an optional manner, for example, when the obtained setting mode of the to-be-displayed screen includes the one-hand mode, the size of the display area of the to-be-displayed screen is determined as ⅔ of the screen size of the to-be-displayed screen.

It should be noted that the foregoing setting manner is merely an example for description, and for different setting modes, the user may set the size of the display area of the to-be-displayed screen based on a requirement.

Step 118: Redraw a window of the to-be-displayed screen based on the obtained size of the display area of the to-be-displayed screen.

In this embodiment of this application, in an optional solution, a function KeyguardDraw/WindowDraw may be set. The function can redraw the window of the to-be-displayed screen based on the size of the display area of the to-be-displayed screen, and display redrawn content in a to-be-displayed area.

In addition, before Step 118 is performed, the method further includes: starting a liquid crystal display (Liquid Crystal Display, LCD for short) power-on procedure by invoking SetPowerModeOn(true), locking the to-be-displayed screen, and continuing to perform Step 118.

Figure 3:
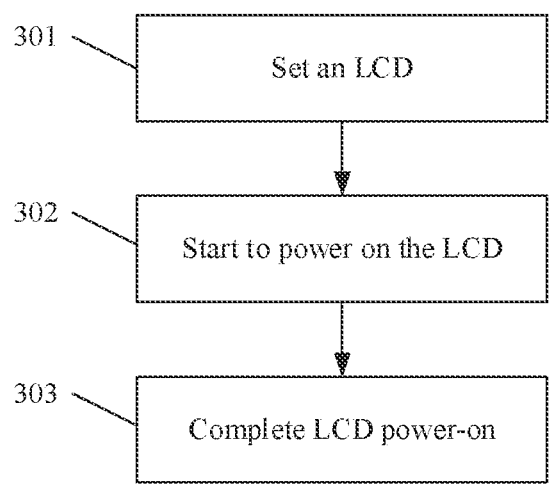
FIG. 3 is a flowchart of powering on an LCD according to an embodiment of this application.

In this embodiment of this application. FIG. 3 is a schematic flowchart of powering on an LCD. As shown in FIG. 3, the started LCD power-on procedure includes step 301 to step 303: setting the LCD→starting to power on the LCD→completing LCD power-on. It should be noted that the LCD power-on procedure and the window redrawing procedure in Step 118 are separately processed by two branches, that is, multi-thread parallel processing. The LCD power-on procedure and the window redrawing procedure in Step 118 are processed in parallel, so that redrawing processing efficiency can be improved, and window redrawing duration can be reduced.

After Step 118 is performed, the method further includes: starting an LCD power-off procedure by invoking SetPowerModeOn(false).

In addition, after Step 110 is performed, a function ScreenOff further needs to be set. The function is used to directly invoke a power-off procedure without setting backlight after window redrawing is completed, to wait for next screen-on. That is, after Step 110 is performed, no backlight is set on the to-be-displayed screen, so that the to-be-displayed screen that is visible to the user is completely dark. Therefore, the redrawn content can be displayed in the to-be-displayed area during next screen-on, thereby resolving a problem, in a related technology, that screen-on duration is increased because redrawing is not performed in advance, and resolving a problem that screen-on duration is further multiplied due to window redrawing performed when a hardware screen size is different. In this way, the screen-on duration is shortened, screen window redrawing efficiency is improved, and user experience of a current device with a foldable screen or a flip screen is greatly improved.

In this embodiment of this application, after Step 118 is performed, the method further includes: displaying the redrawn content on the to-be-displayed screen. For example, a same picture is displayed on display screens of different sizes.

Figure 4A:
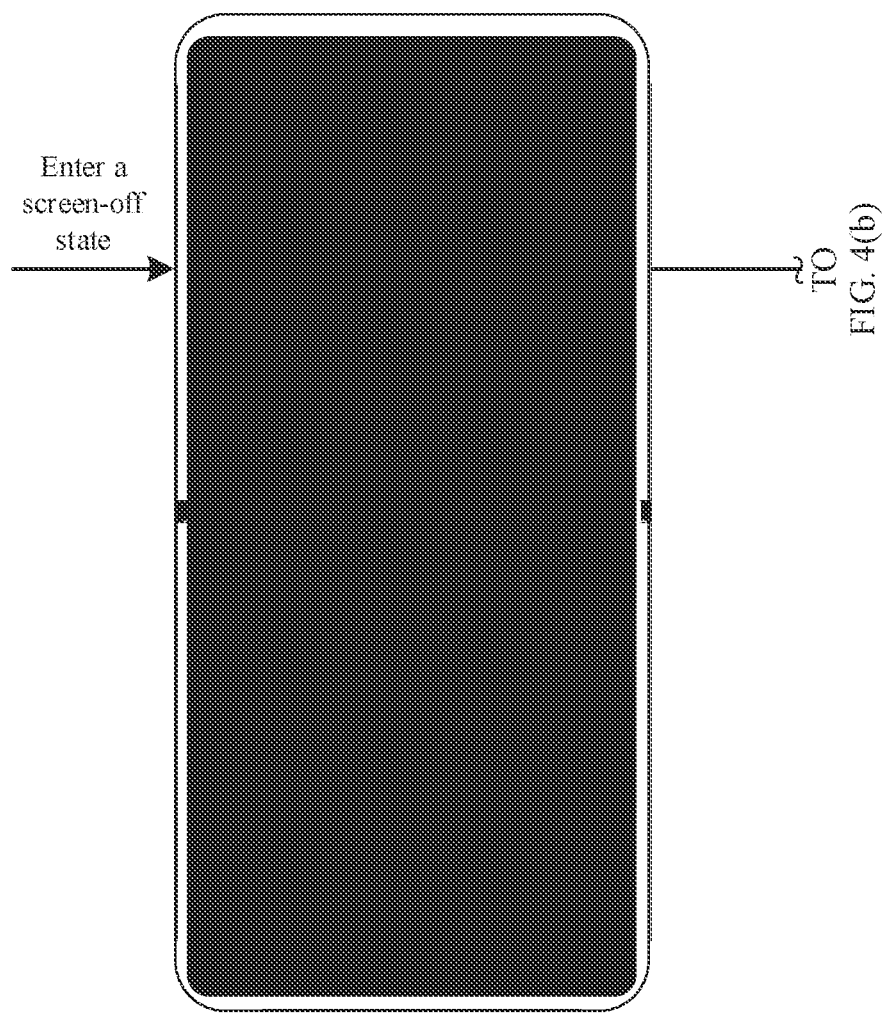
FIG. 4(a) to FIG. 4(c) are a schematic diagram of an effect of screen window redrawing according to an embodiment of this application.
Figure 4B:
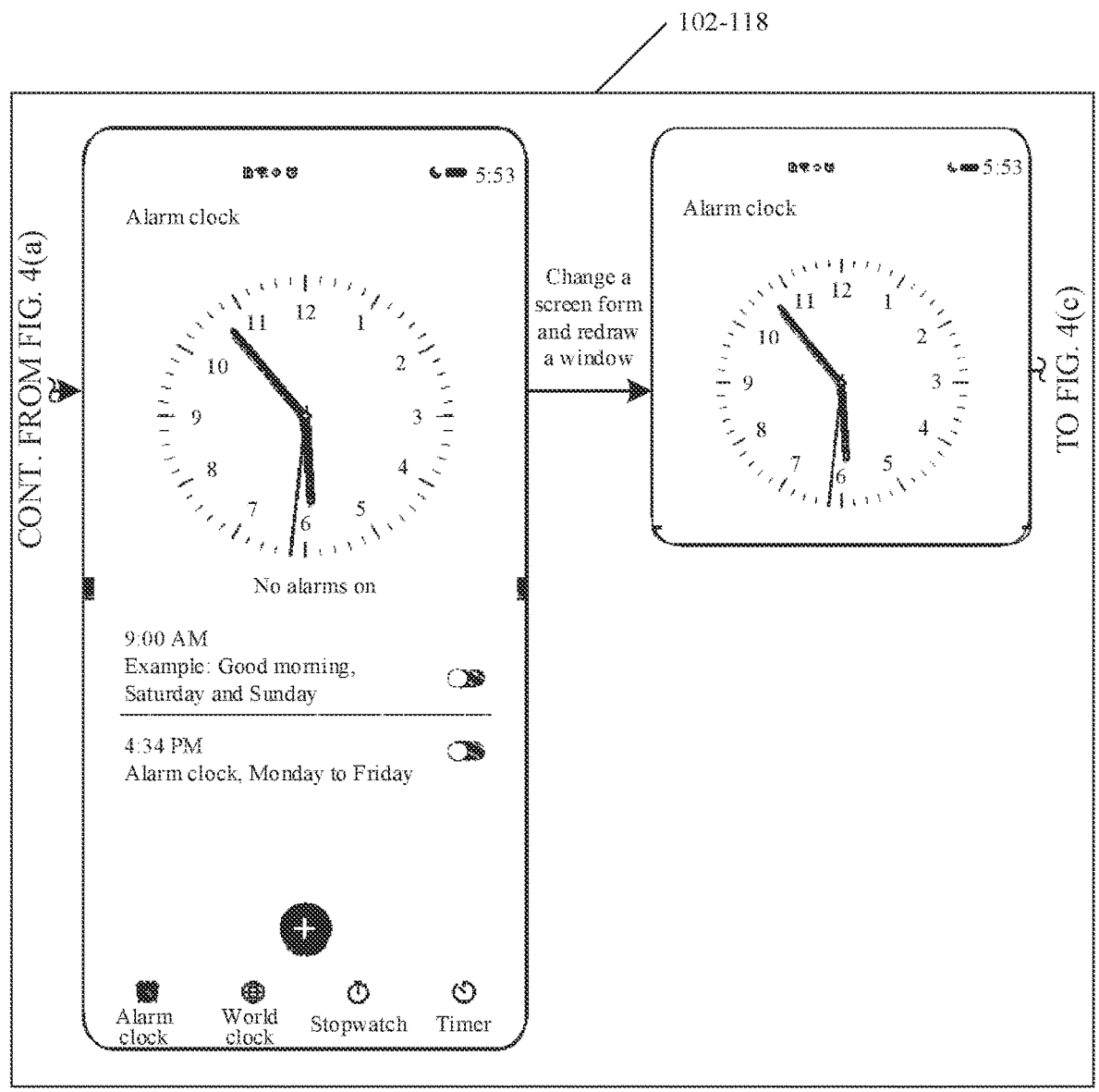
Figure 4C:
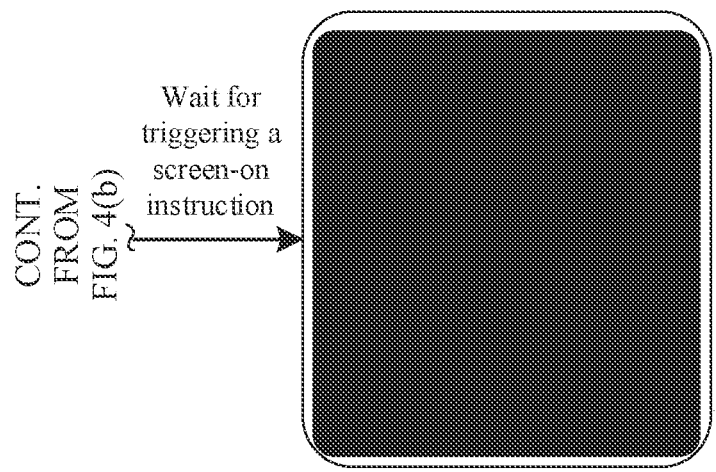

In this embodiment of this application, the screen window redrawing method is performed. As shown in FIG. 4(*a*) to FIG. 4(*c*), a screen is in the screen-off state in FIG. 4(*a*), and a process in FIG. 4(*b*) is a process of performing the screen window redrawing method provided in this embodiment of this application. It should be noted that, in the process of performing the screen window redrawing method, an LCD needs to be set to have no backlight brightness. After window redrawing is completed, as shown in FIG. 4(*c*), a display screen is in the screen-off state, so that redrawn content is directly displayed after next screen-on. Therefore, compared with screen window redrawing in the related technology shown in FIG. 1A to FIG. 1D, in the screen window redrawing method in this embodiment of this application, a screen form change can be identified in the screen-off state, and window redrawing can be completed in advance, thereby resolving the problem, in the related technology, that screen-on duration is increased because window redrawing is not performed in advance, and further resolving the problem that screen-on duration is further multiplied due to window redrawing performed when a hardware screen size is different. In this way, the screen-on duration is shortened, and screen window redrawing efficiency is improved.

In this embodiment of this application, whether the current device is in the screen-off state is detected, and if it is detected that the current device is in the screen-off state, whether the screen form of the current device changes is detected by using the obtained screen form information before screen-off and the obtained screen form information after screen-off. If it is detected that the screen form changes, the to-be-displayed screen is determined based on the screen form information after screen-off. The window of the to-be-displayed screen is redrawn based on the obtained size of the display area of the to-be-displayed screen. In this way, a screen form change is identified in the screen-off state, and window redrawing is completed in advance, to shorten screen-on duration and improve screen window redrawing efficiency.

In this embodiment of this application, further, the screen window redrawing procedure in this application may be verified by using the following procedure:

Step 1: Install a verifiable application in the current device, run the application on an uppermost visible interface, and perform a screen-off operation on the current device by using a screen-off instruction.

Step 2: The user changes the screen form of the current device, records a time point, waits for a period of time, records a time point again, turns on the screen by using a fingerprint, and captures a log.

In this step, a screen change is recorded by using the log, to detect whether redrawing is triggered; and interference is excluded by waiting for a period of time.

Step 3: Determine a life cycle status and time of the verifiable application based on the log, and determine whether window redrawing is triggered during screen-off.

In this step, log verification is used to check whether a life cycle of the application changes and whether a change time point matches a change time point of a screen folding status, to determine whether window redrawing is triggered during screen-off. The life cycle of the application represents an entire display process of an application interface (activity). That is, the display process of the application is used to determine whether the application is redrawn.

Figure 5:
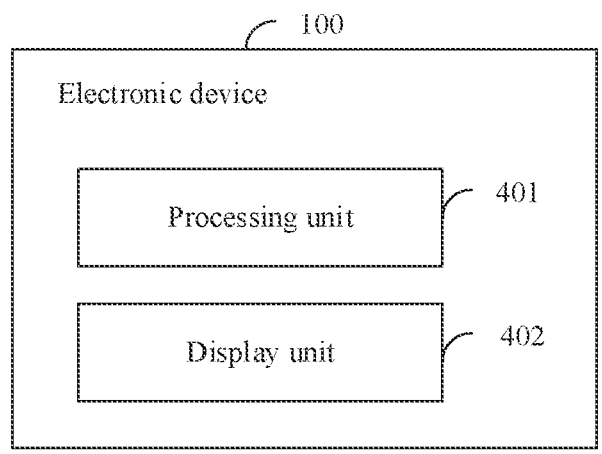
FIG. 5 is a schematic block diagram of an electronic device according to an embodiment of this application.

FIG. 5 is a schematic block diagram of an electronic device 110 according to an embodiment of this application. It should be understood that the electronic device 110 can perform steps in the screen window redrawing method in FIG. 2. To avoid repetition, details are not described herein. As shown in FIG. 5, the electronic device 110 includes a detection unit 401 and a processing unit 402.

The detection module 401 is configured to detect whether the current device is in a screen-off state; and if it is detected that the current device is in the screen-off state, detect, by using obtained screen form information before screen-off and obtained screen form information after screen-off, whether a screen form of the current device changes.

The processing unit 402 is configured to determine a to-be-displayed screen based on the screen form information after screen-off if it is detected that the screen form changes; and redraw a window of the to-be-displayed screen based on an obtained size of a display area of the to-be-displayed screen.

In this embodiment of this application, the detection module 401 is further configured to detect whether the screen form information before screen-off is the same as the screen form information after screen-off; and if it is detected that the screen form information before screen-off is different from the screen form information after screen-off determine that the screen form of the current device changes.

In this embodiment of this application, the screen form information after screen-off includes a screen included angle and a vertical gravity component. The processing unit 402 is further configured to determine a device status of the current device based on the screen included angle, where the device status includes a folded state, a semi-unfolded state, or a fully unfolded state; and determine a screen orientation of the current device based on the device status and the vertical gravity component, and determine a display screen facing a user as the to-be-displayed screen of the current device.

In this embodiment of this application, the processing unit 402 is further configured to obtain a screen identifier corresponding to the to-be-displayed screen, and determine whether the screen identifier is the same as a screen identifier of a display screen before screen-off; if it is determined that the screen identifier is the same as the screen identifier of the display screen before screen-off, determine a screen size of the display screen before screen-off as a screen size of the to-be-displayed screen; and determine the size of the display area of the to-be-displayed screen based on an obtained setting mode of the to-be-displayed screen and the screen size of the to-be-displayed screen, and continue to perform the step of redrawing a window of the to-be-displayed screen based on an obtained size of a display area of the to-be-displayed screen, where the setting mode is used to indicate a running scenario of the current device; or if it is determined that the screen identifier is different from the screen identifier of the display screen before screen-off, determine a screen size of the to-be-displayed screen based on the screen identifier; and determine the size of the display area of the to-be-displayed screen based on an obtained setting mode of the to-be-displayed screen and the screen size of the to-be-displayed screen, and continue to perform the step of redrawing a window of the to-be-displayed screen based on an obtained size of a display area of the to-be-displayed screen.

In this embodiment of this application, whether the current device is in the screen-off state is detected, and if it is detected that the current device is in the screen-off state, whether the screen form of the current device changes is detected by using the obtained screen form information before screen-off and the obtained screen form information after screen-off. If it is detected that the screen form changes, the to-be-displayed screen is determined based on the screen form information after screen-off. The window of the to-be-displayed screen is redrawn based on the obtained size of the display area of the to-be-displayed screen. In this way, a screen form change is identified in the screen-off state, and window redrawing is completed in advance, to shorten screen-on duration and improve screen window redrawing efficiency.

It should be understood that the electronic device 110 herein is embodied in a form of a functional unit. The term "unit" herein may be implemented in a form of software and/or hardware. This is not specifically limited. For example, the "unit" may be a software program or a hardware circuit that implements the foregoing function, or a combination of the software program and the hardware circuit. The hardware circuit may include an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function.

Therefore, the units in the example described in this embodiment of this application can be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

An embodiment of this application further provides an electronic device. The electronic device may be a current device, or may be a circuit device built in the current device. The device may be configured to perform functions/steps in the foregoing method embodiment.

Figure 6:
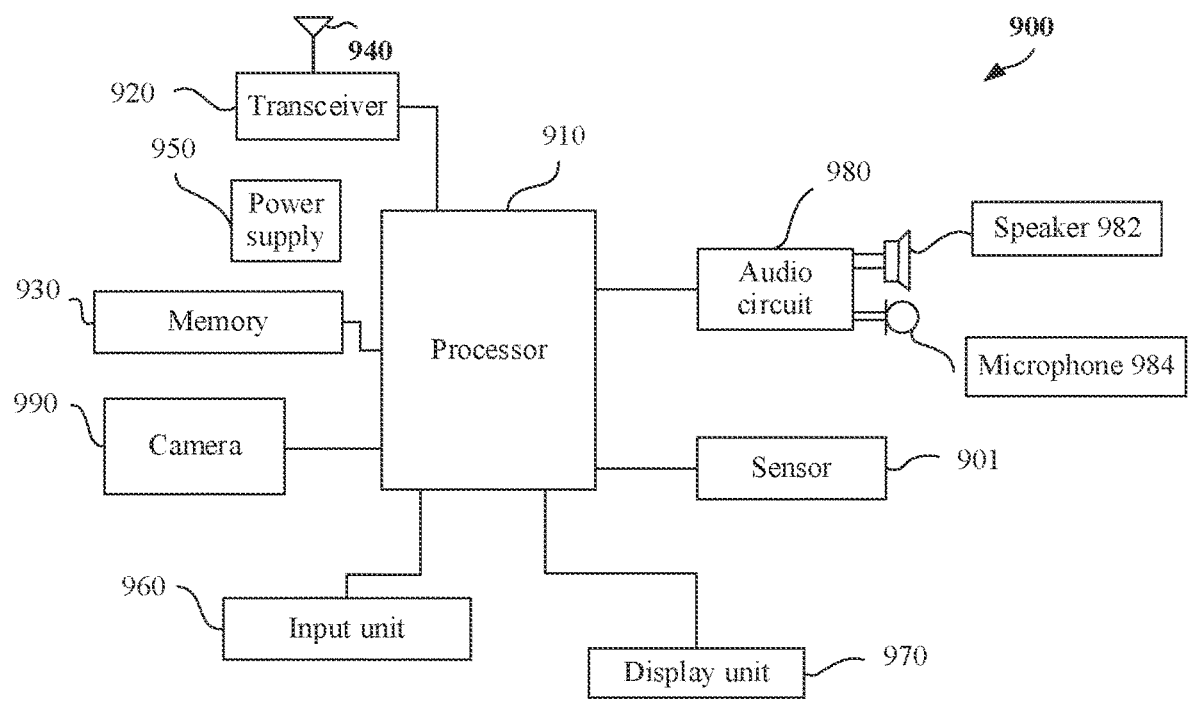
FIG. 6 is a schematic diagram of a structure of an electronic device according to an embodiment of this application.

FIG. 6 is a schematic diagram of a structure of an electronic device according to an embodiment of this application. As shown in FIG. 6, an electronic device 900 includes a processor 910 and a transceiver 920. Optionally, the electronic device 900 may further include a memory 930. The processor 910, the transceiver 920, and the memory 930 may communicate with each other by using an internal connection path, to transmit a control signal and/or a data signal. The memory 930 is configured to store a computer program. The processor 910 is configured to invoke and run the computer program from the memory 930.

Optionally, the electronic device 900 may further include an antenna 940, configured to send a radio signal output by the transceiver 920.

The processor 910 and the memory 930 may be combined into one processing apparatus, or more commonly, may be components that are independent of each other. The processor 910 is configured to execute program code stored in the memory 930, to implement the foregoing function. During specific implementation, the memory 930 may alternatively be integrated into the processor 910, or may be independent of the processor 910. The processor 910 may correspond to the processing unit 402 in the electronic device 110 in FIG. 5.

In addition, to improve functions of the electronic device 900, the electronic device 900 may further include one or more of an input unit 960, a display unit 970, an audio circuit 980, a camera 990, a sensor 901, or the like. The audio circuit may further include a speaker 982, a microphone 984, and the like. The display unit 970 may include a display screen.

Optionally, the electronic device 900 may further include a power supply 950, configured to supply power to various components or circuits in the current device.

It should be understood that the electronic device 900 shown in FIG. 6 can implement processes in the method embodiment shown in FIG. 2. Operations and/or functions of units in the electronic device 900 are respectively used to implement corresponding procedures in the foregoing method embodiment. For details, refer to the descriptions in the foregoing method embodiments. To avoid repetition, detailed descriptions are appropriately omitted herein.

It should be understood that the processor 910 in the electronic device 900 shown in FIG. 6 may be a system on a chip (system on a chip, SOC). The processor 910 may include a central processing unit (central processing unit, CPU), and may further include another type of processor. The CPU may be referred to as a host CPU. A neural network processor NPU 30 is mounted to the host CPU (Host CPU) as a coprocessor, and the host CPU allocates a task. Processors work together to implement the foregoing method procedure, and each processor may selectively execute a part of a software driver.

In conclusion, processors or processing units in the processor 910 may cooperate to implement the foregoing method procedure, and software programs corresponding to the processors or the processing units may be stored in the memory 930.

This application further provides a computer-readable storage medium. The computer-readable storage medium stores instructions, and when the instructions are run on a computer, the computer is enabled to perform steps in the screen window redrawing method shown in FIG. 2.

In the foregoing embodiments, the processor 910 may include, for example, a central processing unit (central processing unit, CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (application-specific integrated circuit, ASIC), or one or more integrated circuits configured to control program execution of the technical solutions of this application. In addition, the processor may have a function of operating one or more software programs, and the software programs may be stored in the memory.

The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory. EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer, or the like.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of these items, including a single item or any combination of a plurality of items. For example, at least one of a, b, or c may indicate a, b, c, a and b, a and c, b and c, or a, b, and c, where a, b, and c may be singular or plural.

A person of ordinary skill in the art may be aware that the units and algorithm steps described in embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments provided in this application, when any function is implemented in a form of a software functional unit and sold or used as an independent product, the function may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a foldable device and comprising:
    displaying content on a display screen of the foldable device before a screen-off state of the display screen;
    obtaining first screen form information of the display screen before the screen-off state;
    entering the screen-off state;
    obtaining second screen form information of the display screen after entering the screen-off state;
    detecting, based on the first screen form information and the second screen form information, that a screen form of the foldable device changes after entering the screen-off state, wherein the first and second screen form information comprise a screen included angle and a vertical gravity component;
    redrawing, when the screen form changes and while the foldable device is in the screen-off state, the content based on the second screen form information and a size of the display screen in a changed screen form; and
    displaying the redrawn content on the display screen when the foldable device transitions from the screen-off state to a screen-on state.

2. The method of claim 1, wherein the screen form of the foldable device changes when the first screen form information is different from the second screen form information.

3. The method of claim 2, wherein the method further comprises determining, based on a screen orientation of the foldable device, the display screen facing a user as a to-be-displayed screen of the foldable device, wherein the screen orientation is based on a device status of the foldable device and the vertical gravity component, wherein the device status is based on the screen included angle, and wherein the device status comprises a folded state, a semi-unfolded state, or a fully unfolded state.

4. The method of claim 3, further comprising:
    obtaining a first screen identifier corresponding to the to-be-displayed screen, wherein the first screen identifier is the same as a second screen identifier of the display screen before the screen-off state; and determining a first screen size of the display screen before the screen-off state as a second screen size of the to-be-displayed screen, wherein the size of the display screen is based on a setting mode of the to-be-displayed screen and the second screen size, and wherein the setting mode indicates a running scenario of the foldable device.

5. The method of claim 3, wherein further comprising obtaining a first screen identifier corresponding to the to-be-displayed screen, wherein the first screen identifier is different from a second screen identifier of the display screen before the screen-off state, wherein a screen size of the to-be-displayed screen is based on the first screen identifier, and wherein the size of the display screen is based on a setting mode of the to-be-displayed screen and the screen size.

6. The method of claim 1, wherein the screen-off state indicates that the foldable device is in a background working state.

7. The method of claim 1, wherein the screen form indicates a screen posture of the foldable device and a screen size ratio change.

8. The method of claim 7, wherein the screen posture comprises a folding inward posture, a folding outward posture, or a flipping posture.

9. A foldable device, comprising:
a memory configured to store instructions; and
a processor coupled to the memory and configured to:
display content on a display screen of the foldable device before a screen-off state of the display screen;
obtain first screen form information of the display screen before the screen-off state;
enter the screen-off state;
obtain second screen form information of the display screen after entering the screen-off state;
detect, based on the first screen form information and the second screen form information, that a screen form of the foldable device changes after entering the screen-off state, wherein the first and second screen form information comprise a screen included angle and a vertical gravity component;
redraw, when the screen form changes and while the foldable device is in the screen-off state, the content based on the second screen form information and a size of the display screen in a changed screen form; and
display the redrawn content on the display screen when the foldable device transitions from the screen-off state to a screen-on state.

10. The foldable device of claim 9, wherein the screen form changes when the first screen form information is different from the second screen form information.

11. The foldable device of claim 10, wherein the processor is further configured to determine, based on a screen orientation of the foldable device, the display screen facing a user as a to-be-displayed screen of the foldable device, wherein the screen orientation is based on a device status of the foldable device and the vertical gravity component, wherein the device status is based on the screen included angle, and wherein the device status comprises a folded state, a semi-unfolded state, or a fully unfolded state.

12. The foldable device of claim 11, wherein the processor is further configured to:
obtain a first screen identifier corresponding to the to-be-displayed screen, wherein the first screen identifier is the same as a second screen identifier of the display screen before the screen-off state; and determine a first screen size of the display screen before the screen-off state as a second screen size of the to-be-displayed screen, wherein the size of the display screen is based on a setting mode of the to-be-displayed screen and the second screen size, and wherein the setting mode indicates a running scenario of the foldable device.

13. The foldable device of claim 11, wherein the processor is further configured to obtain a first screen identifier corresponding to the to-be-displayed screen, wherein the first screen identifier is different from a second screen identifier of the display screen before the screen-off state wherein a screen size of the to-be-displayed screen is based on the first screen identifier, and wherein the size of the display screen is based on a setting mode of the to-be-displayed screen and the screen size.

14. A computer program product comprising computer-executable instructions that are stored on a non-transitory computer-readable storage medium and that, when executed by a processor, cause a foldable device to:
display content on a display screen of the foldable device before a screen-off state of the display screen;
obtain first screen form information of the display screen before the screen-off state;
enter the screen-off state;
obtain second screen form information of the display screen after entering the screen-off state;
detect, based on the first screen form information and the second screen form information, that a screen form of the foldable device changes after entering the screen-off state, wherein the first and second screen form information comprise a screen included angle and a vertical gravity component;
redraw, when the screen form changes and while the foldable device is in the screen-off state, the content based on the second screen form information and a size of the display screen in a changed screen form; and
display the redrawn content on the display screen when the foldable device transitions from the screen-off state to a screen-on state.

15. The computer program product of claim 14, wherein the screen form changes when the first screen form information is different from the second screen form information.

16. The computer program product of claim 15, wherein the instructions, when executed by the processor, further cause the foldable device to determine, based on a screen orientation of the foldable device, the display screen facing a user as a to-be-displayed screen of the foldable device, wherein the screen orientation is based on a device status of the foldable device and the vertical gravity component, wherein the device status is based on the screen included angle, and wherein the device status comprises a folded state, a semi-unfolded state, or a fully unfolded state.

17. The computer program product of claim 16, wherein the instructions, when executed by the processor, further cause the foldable device to:
obtain a first screen identifier corresponding to the to-be-displayed screen, wherein the first screen identifier is the same as a second screen identifier of the display screen before the screen-off state; and
determine a first screen size of the display screen before the screen-off state as a second screen size of the to-be-displayed screen, wherein the size of the display screen is based on a setting mode of the to-be-displayed screen and the second screen size, and wherein the setting mode indicates a running scenario of the foldable device.

18. The computer program product of claim 16, wherein the instructions, when executed by the processor, further cause the foldable device to obtain a first screen identifier corresponding to the to-be-displayed screen, wherein the first screen identifier is different from a second screen identifier of the display screen before the screen-off state, wherein a screen size of the to-be-displayed screen is based on the first screen identifier, and wherein the size of the display screen is based on a setting mode of the to-be-displayed screen and the screen size.

19. The computer program product of claim 14, wherein the screen-off state indicates that the foldable device is in a background working state.

20. The computer program product of claim 14, wherein the screen form indicates a screen posture of the foldable device and a screen size ratio change.

* * * * *